United States Patent [19]
Balsells

[11] Patent Number: 5,108,078
[45] Date of Patent: * Apr. 28, 1992

[54] CANTED-COIL SPRING LOADED WHILE IN A CAVITY

[75] Inventor: Peter J. Balsells, P.O. Box 15092, Santa Ana, Calif. 92705

[73] Assignees: Peter J. Balsells; Joan C. Balsells, both of Santa Ana, Calif.

[*] Notice: The portion of the term of this patent subsequent to May 16, 2006 has been disclaimed.

[21] Appl. No.: 463,480

[22] Filed: Jan. 11, 1990

Related U.S. Application Data

[63] Continuation-in-part of Ser. No. 348,419, May 8, 1989, Pat. No. 4,974,821, which is a continuation-in-part of Ser. No. 186,017, Apr. 25, 1988, Pat. No. 4,830,344.

[51] Int. Cl.⁵ .............................. F16F 1/06
[52] U.S. Cl. ..................... 267/167; 267/1.5; 267/180; 277/163; 277/164
[58] Field of Search ............. 267/167, 1.5, 180; 277/163, 164, 205

[56] References Cited

U.S. PATENT DOCUMENTS

| 3,183,010 | 5/1965 | Bram | 277/235 |
|---|---|---|---|
| 3,323,785 | 6/1967 | Mather | 267/167 |
| 3,468,527 | 9/1969 | Mather | 267/1.5 |
| 4,655,462 | 4/1987 | Balsells | 277/164 X |
| 4,678,210 | 7/1987 | Balsells | 285/318 |
| 4,804,290 | 2/1989 | Balsells | 267/164 X |
| 4,805,943 | 2/1989 | Balsells | 285/305 X |
| 4,826,144 | 5/1989 | Balsells | 267/167 |
| 4,830,344 | 5/1989 | Balsells | 267/164 X |
| 4,893,795 | 1/1990 | Balsells | 267/1.5 |
| 4,915,366 | 4/1990 | Balsells | 267/167 |
| 4,974,821 | 12/1990 | Balsells | 267/167 |

Primary Examiner—Douglas C. Butler
Attorney, Agent, or Firm—Walter A. Hackler

[57] ABSTRACT

A canted coil spring assembly includes a plurality of coils having a major and a minor axis and canted along a centerline defined by an intersection of the major and minor axis. A trailing portion of each coil is defined by a back angle which determines the load deflection characteristics of the canted coil assembly. A leading portion of each coil is defined by a front angle and a plurality of coils are non-invasively supported in a preselected orientation for controlling the resilient characteristics of the coils.

11 Claims, 7 Drawing Sheets

RADIAL SPRING COMPRESSED AXIALLY TURNED ANGLE 90°

AXIAL SPRING TURNED 30° COUNTERCLOCKWISE

AXIAL FLAT SPRING

AXIAL SPRING TURNED 30° CLOCKWISE

AXIAL SPRING TURNED 60° CLOCKWISE

CANTED-COIL SPRING LOADED WHILE IN A CAVITY

The present application is a continuation-in-part U.S. Patent Application Ser. No. 348,419, filed May 8, 1989, now U.S. Pat. No. 4,974,821, which is a continuation-in-part of U.S. Patent Application Ser. No. 186,017, filed Apr. 25, 1988, now U.S. Pat. No. 4,830,344. U.S. Ser. No. 348,419 and U.S. Pat. No. 4,830,344 are to be totally incorporated, including drawings, into the present application by this specific reference thereto.

The present invention generally relates to canted-coil springs and seals and, more particularly, relates to canted-coil springs retained in a cavity with interference between the spring coils and the cavity to retain the spring in a selected orientation for subsequent loading of the spring. Orienting the spring for major or minor axis loading enables a specific selected resilient, or load-deflection, characteristic, in response to the subsequent loading of the springs.

It should be appreciated that cavities as hereinafter discussed may be linear or continuous with a desired shape, be it circular or otherwise. For as in circular cavities, the spring may have both ends joined by butting the end coils, overlapping the end coils or welding the coil ends thereby forming a garter-type canted coil spring.

A general discussion of these types of garter-type springs appears in U.S. Pat. Nos. 3,323,735 and 3,468,527 to Mather. The prior art springs of Mather are limited in their application and specifically limited to the slant angle of the coils as set forth therein.

Further advancement in spring design as set forth in companion patent application entitled "Inside Back Angle Canted Coil Spring", Ser. No. 186,016, filed Apr. 25, 1988, and U.S. Pat. No. 4,826,144 for "Outside Back Angle Canted Coil Spring", have enabled the design of springs having performance characteristics beyond that of the art prior thereto.

The force-deflection characteristics of heretofore available garter-type axial springs have been varied by changing numerous spring parameters, including the wire size, the coil height, the coil spacing, and the front angle, known as the slant angle in the hereinabove referenced Mather patents, which defines a leading portion of each canted spring coil. While these parameters can be used effectively to tailor the load-deflection characteristics of the spring, they do not dominate or enable the spring to achieve its total design potential.

A heretofore unrecognized parameter substantially affecting the performance of garter-type axial loaded springs, is set forth in U.S. Patent Application Ser. No. 186,016, filed Apr. 25, 1988 and U.S. Patent Application Ser. No. 186,018, filed Apr. 25, 1988, now U.S. Pat. No. 4,826,144. These references disclose coils which are interconnected in a manner forming a garter-type resilient coil spring, with the trailing portion along an outside diameter of the garter-type axially resilient coil spring, and the leading portion along an inside diameter of the garter-type axially resilient coil spring and vice-versa.

The selected disposition of the back angle and trailing portions defined thereby provides for the capability of tailoring a garter-type axially resilient coil spring beyond the range of conventional garter-type resilient coil springs heretofore known.

As a consequence, springs may be formulated with a higher load-deflection characteristics. That is, the spring is able to exert a greater force in response to a given deflection than a spring having the same dimensions and wire size with a trailing portion along the inside diameter of the spring.

As a result, these springs can be fabricated from smaller wire and have a closer coil spacing, while still exerting the same force in response to deflection as prior art springs.

The present invention is related to the discovery that of other parameters which can be utilized to design garter-type springs having selected load-deflection characteristics.

First, it has been found that the turn angle, as hereinafter defined and discussed, can be utilized in the fabrication of garter-type axially loaded springs having higher load-deflection characteristics than heretofore fabricated springs utilizing the same wire diameters. The advantages of higher loading have been hereinabove discussed.

In addition, the specific relationship and working resilient range of springs made in accordance with the present invention, can also be used to advantage and provide springs with tailored load-deflection characteristics which were not heretofore possible.

Second, it has been found that loading of the garter-type springs along the major axis thereof, as hereinafter discussed, with or without variation of the turn angle provides additional means for tailoring the load-deflection characteristics of the spring and causing such spring to cant along the major axis thereof radially from the inside or radially from the outside under an applied radial force.

It should be appreciated that in order for the spring to cant upon major axis radial loading, it needs to be contained in a cavity. It has been found that when the spring is in a free position and loaded along the major axis in a radial direction, it will resist canting or not cant at all.

In addition, the spring may be mounted, or contained, in a position wherein it will cant radially along the major axis and radially along the minor axis under application of both a radial and axial force.

It is important to recognize that while many parameters affecting the load-deflection characteristics of the garter-type springs, such as those hereinabove recited in connection with the discussion of the prior art, have little, or significantly different effect on the resilient characteristics of the spring, if the coils are not free to flex or bend in an uninhibited manner. For example, Bram discloses in U.S. Pat. No. 3,183,010, a reinforcement for a sealing element which takes the shape of a garter-type spring, and in fact, discloses a turn angle in that reinforcement element.

However, this disclosure of a reinforcement element, while in the shape of a spring, is not free to flex because it is imbedded in the body of a sealing element so as to be flush with the surface thereof. It is obvious that when so imbedded, this reinforcement element, or spring, is not free to flex with the load-deflection characteristics that it would have in free space, that is, uninhibited deflection under load.

A spring, in accordance with the present invention, provides operational load-deflection characteristics which may be used to advantage in the design of springs for applications heretofore not possible.

SUMMARY OF THE INVENTION

The canted-coil spring apparatus in accordance with the present invention generally includes a plurality of coils having a major and minor axis which are canted along a centerline defined by an intersection of the major and minor axis. Back angle means is provided for both defining the disposition of a trailing portion of each coil with respect to a line normal to the centerline and for determining the load-deflection characteristics of the canted-coil spring. Front angle means is provided for defining the disposition of a leading portion of each coil with respect to the normal line, with the front angle means being greater than the back angle means. Also provided in accordance with the present invention are means for non-invasively supporting the plurality of coils in a preselected orientation for controlling the resilient characteristics of the plurality of coils.

More particularly, the coils may be interconnected in a manner forming a garter-type resilient canted-coil spring and the means for non-invasively supporting the garter-type resilient coil may include means defining a cavity for deflecting the spring along the minor axis thereof and enabling the garter-type resilient coil spring to be loaded along the major axis thereof. Alternatively, the cavity may provide means for deflecting the spring along the major axis thereof and enabling the garter-type resilient coil spring to be loaded along the major axis thereof.

In addition, the trailing portion may be disposed on an outside diameter of the garter-type resilient canted-coil spring and the leading portion disposed along an inside diameter of the garter-type resilient coil spring. Alternatively, the trailing portion may be disposed along an inside diameter of the garter-type spring and the leading portion may be disposed along an outside diameter of the garter-type coil spring. The back angle is selected to provide a load-deflection characteristic in which the load remains relatively constant within a working deflection and, further, the cavity means may have a width at most equal to the coil height or in another embodiment in which the cavity means may have a width greater than the coil height but less than the coil width.

BRIEF DESCRIPTION OF THE DRAWINGS

The advantages and features of the present invention will appear from the following description, when considered in conjunction with the accompanying drawings in which.

DETAILED DESCRIPTION

Figure 2:
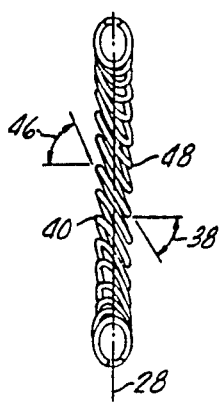
FIG. 2 is a view taken along line 2—2 of the spring in FIG. 1 showing a back angle on an inside diameter of the spring and a front angle on an outside diameter of the spring.

Turning now to FIGS. 1 through 6, there is shown a number of canted coil spring assemblies 10, 12, 14, 16, in accordance with the present invention, each including a plurality of coils 18, 20, 22, 24, respectively, canted along centerlines 28, 30, 32, 34.

Springs 10 and 12 have the coils 18, 20 interconnected in a manner forming a circular spring having primary load-deflection characteristics along an axial direction of the circular springs 10, 12. Spring 10 shown in FIG. 1, which has a clockwise canting of coils, has the coils 18 interconnected so that a back angle 38, which defines a trailing portion 40, is along an inside diameter 42 of the spring 10 and a front angle 46, which defines a leading portion 48 of the coil 18 is along an outside diameter 50 of the spring 10, see FIG. 2.

Figure 4:
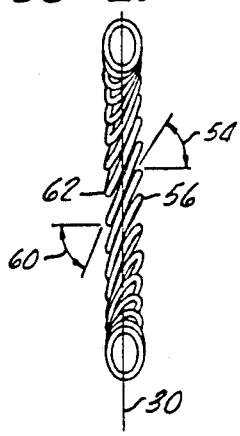
FIG. 4 is a view of the spring of FIG. 3 taken along the line 4—4 showing a back angle on an outside diameter of the spring and a front angle on an inside diameter of the spring.
Figure 3:
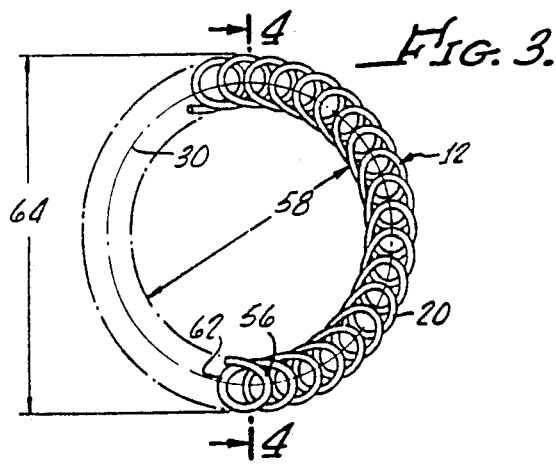
FIG. 3 is a spring in accordance with the present invention in which the coils are canted in a counter-clockwise manner.

Turning to FIGS. 3 and 4, the axial spring 12 therein has the coils 20 interconnected in a fashion having a counter-clockwise canting of coils with a back angle 54, defining a trailing portion 56, along inside diameter 58 of the spring 12 and a front angle 60, defining a leading portion 62, along an outside diameter 64 of the spring 12.

Figure 5:
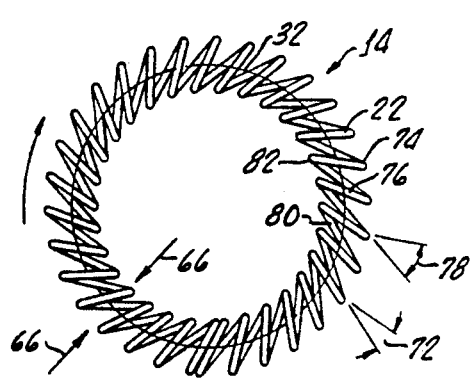
FIG. 5 is a plane view of a radial spring in accordance with the present invention, which is canted in a clockwise direction about the centerline thereof, with the back angle on the top thereof.
Figure 6:
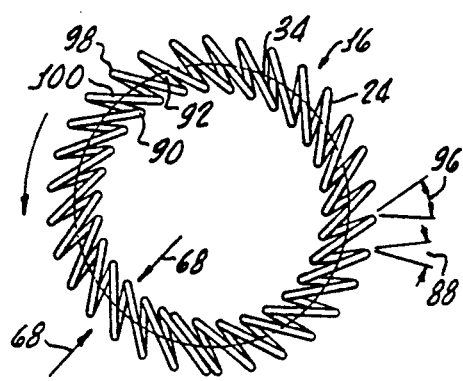
FIG. 6 is a canted coil radial spring in accordance with the present invention in which the coils are canted in a counter-clockwise direction and the back angle is disposed on the bottom thereof.

Turning now to FIGS. 5 and 6, there is shown springs 14, 16 having a plurality of coils 20, 24 which are interconnected in a manner forming a circular spring having a primary load-deflection characteristic along a radial direction indicated by the arrows 66, 68. As shown in FIG. 5, the coils are interconnected in a manner for providing a clockwise canting with back angle 72 defining a trailing portion 74 along a top 76 and a front angle 78 defining a leading portion 80 which is disposed along a bottom 82 of the spring 14.

Alternatively, as shown in FIG. 6, the spring 16 may have coils 24 interconnected in a manner causing canting of the coils in a counter-clockwise direction with a back angle 88 defining a trailing portion 90 along a bottom 92 of the spring 16 and a front angle 96 defining a leading portion 98 disposed along a top 100 of the spring 16.

As hereinafter described, all of the springs 10, 12, 14, 16, may have a generally constant force-deflection characteristic within a working deflection thereof.

Figure 7:
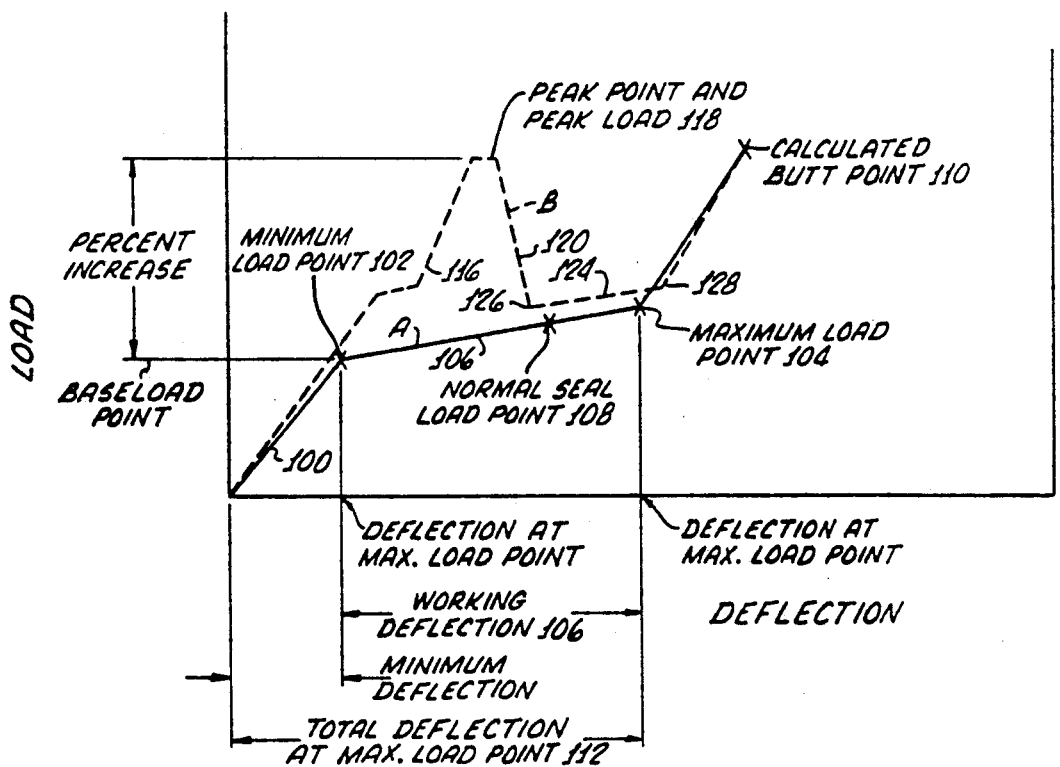
FIG. 7 shows load-deflection curves for springs assembled in accordance with the present invention.

In FIG. 7 there is shown a load-deflection curves A and B for the purpose of illustrating the characteristics of the canted coil garter-type resilient coil springs.

As shown by curve A when a load is applied to an annular spring, the spring deflects in a general linear fashion as shown by the line segment 100 until it reaches minimum load point 102 which represents the point at which, after initial deflection, the load begins to remain relatively constant.

Between the minimum load point 102 and a maximum load point 104, the load-deflection curve may be constant or show a slight increase, as shown in FIG. 7. The area between the minimum load point 102 and the maximum load point 104 is known as the working deflection range 106. The spring is normally loaded for operation within this range, as indicated by point 108 for a typical spring utilized in conjunction with seal, gasket, or the like, for sealing purposes.

Loading of the spring beyond the maximum load point 104 results in abrupt deflection response until it reaches a butt point 110, which results in a permanent set in the spring as a result of overloading. Also indicated in FIG. 7 is the total deflection range 112 which is defined as the deflection between the unloaded spring and the deflection at the maximum load point 104.

Also shown in FIG. 7, is a load-deflection curve B showing the characteristics of the spring 10, 12, 14, 16 made in accordance with the present invention, showing a linear load-deflection segment 116 until a peak load point 118 is reached. After the peak point 38, the load decreases with deflection in segment 120. This results in a saddle-type deflection range between the peak point 118 and the butt point 110.

This type of load-deflection characteristic may have specific advantage for spring seals which are locked in position, such as a groove, with the tension thereof being caused by the spring. In this instance, while the spring produces a relatively constant load over a given working deflection range 124, changes beyond the working range limits at points 126, 128 causes an abrupt increase in load. This causes the spring seal to be self-centering within a groove, or the like.

Other applications in which the spring of the present invention may be used to advantage include static applications where a heavy load is desired with no increase in wire diameter of spacing of coils. Still another application is where a heavy initial load is desired such as in seals subjected to cryovac temperature and the like.

Figure 8:
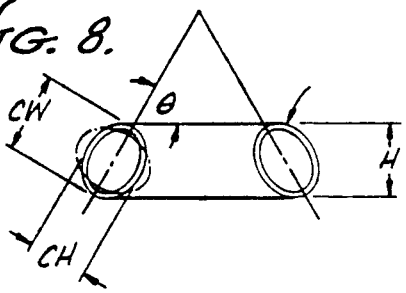
FIG. 8 is a schematic of an axially canted coil spring with turn angle $\theta$ shown for the purpose of illustrating how the turn angle $\theta$ may be calculated.

FIG. 8 shows a schematic form a cross-section of a canted coil spring 10, 12, 14, 16 in accordance with the present invention, with a free turn angle $\theta$, a measured coil width of CW, a measured coil height of CH and a measured spring height H. In FIG. 8, the free turn angle $\theta$ may be clockwise (bold lines) or counterclockwise. (Dashed lines).

Figure 9A:
FIGS. 9a, b, c and d and e illustrate axial and radial springs having various turn angles.
Figure 9B:
Figure 9C:
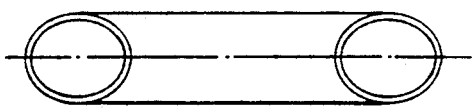
Figure 9D:
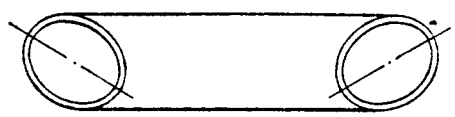
Figure 9E:
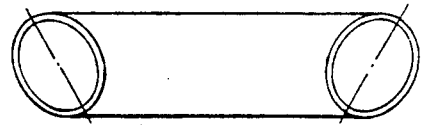

As shown in FIG. 9a, an axially flat spring may be turned up counterclockwise, for example, 30 degrees, as shown in FIG. 9b, or turned clockwise, as for example, shown in FIGS. 9c and 9d, with 30 degrees and 60 degrees turn angles, respectively. It should be appreciated that while the springs shown are shown with an elliptical shape, other shapes are possible, such as circular or rectangular, depending upon the configuration of the mating parts between which the spring 10, 12, 14, 16 is to be placed.

As shown in the FIG. 8, the free turn angle $\theta$ is defined as an angle formed by a generally circular spring forming a cone or an inverted cone, depending on the position of the spring and measuring the angle $\theta$ from the horizontal to the intersection through the centerline of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading, is independent upon whether the spring is in the cone shape as shown in FIG. 9b, or an inverted cone as shown in 9c. That is, the springs in 9b and 9c will perform in identical fashion.

Figure 10:
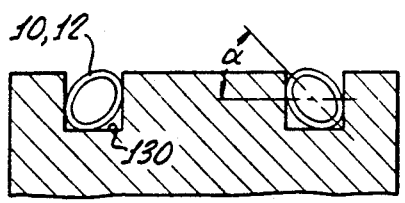
FIG. 10 shows an axial spring assuming an assembly turn angle position when the spring is installed in a groove.
Figure 11:
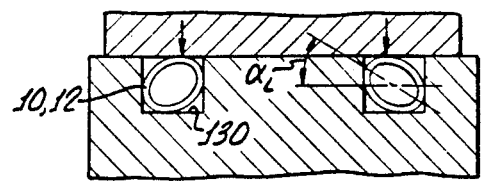
FIG. 11 shows an axial spring assuming a load turn angle position upon loading thereof.

FIG. 10 shows an axial spring 10, 12 within a groove 130 deflecting the spring so that it assumes an assembly turn angle $\alpha$. Upon axial loading, the spring 10, 12 assumes a load turn angle $\alpha_L$ as shown in FIG. 11.

Curves A, B, C and D, in FIG. 5 show the force-deflection characteristics of a series of springs, with $\theta$ varied from zero degrees to 90 degrees, with a specification of these springs being set forth in Table 1. Each of the springs A, B, C, D, are identical in all respects, except for the turn angle $\theta$.

Figure 1:
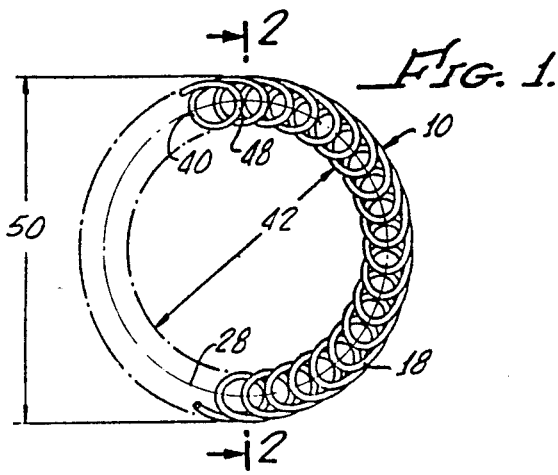
FIG. 1 is a canted coil spring in accordance with the present invention, with the coils being canted in a clockwise direction.

As described in copending applications, Ser. No. 186,016 and 186,018, springs A, B, C, D, are constructed having a specific trailing portion 40, 56 defined by a back angle 38, 54 made between the trailing portion 40, 56 and a normal to centerline 18, 30 of the spring 10, 12. See FIGS. 1 and 2. In addition, a front angle 46, 60 defines a leading portion 48, 62 of the springs 10, 12 by the angle the leading portion 48, 62 makes with a normal to the centerline 18, 30. FIG. 1 shows the spring 10 having the trailing portion 40 along the inside diameter 42 of the spring, with FIG. 2 showing the spring 12 having the trailing portion 56 along the outside diameter 64 of the spring 12. As can be seen, from FIGS. 1 and 2, as each coil is traced in a circular-like manner about the centerline, each revolution includes a trailing portion and a leading portion, with the leading portion advancing movement along the centerline more than the advancement along the centerline when following the trailing portion of the coil.

A more detailed description of inside back angle canted coil springs and outside angle canted coil springs may be had from the hereinabove referenced copending patent applications which are herewith expressively incorporated by reference thereto. The effect of the trailing portion being disposed on the inside or the outside of the canted coil spring 10, 12 will be hereinafter discussed in greater detail.

Turning back to FIG. 12, curve A represents a spring with a turn angle of zero and Curve B represents a spring having a turn angle of 15 degrees and manifests a threshold rise 136, characteristic of springs made in accordance with the present invention. This gradual rise develops into the peak load characteristics more clearly shown by curves C, D and E, corresponding to springs C, D and E of Table 1.

TABLE 1

| | Spring Height (CH) = | | 0.163 in. |
|---|---|---|---|
| | Coil Width (CW) = | | 0.180 in. |
| | Turned Height (H) = | | 0.179 in. |
| | Wire Diameter (WD) = | | 0.222 in. |
| | Coil Spacing = | | 0.018 in. |
| | Number of Coils = | | 67 |
| Spring | Turn Angle (deg.) | Peak Load Value (lbs.) | Increase Over Base Load (%) |
| A | 0 | NA | NA |
| B | 15 | 100 | 100% |
| C | 58 | 100 | 150% |
| D | 76 | 450 | 1025% |
| E | 90 | 730 | 1725% |

Figure 12:
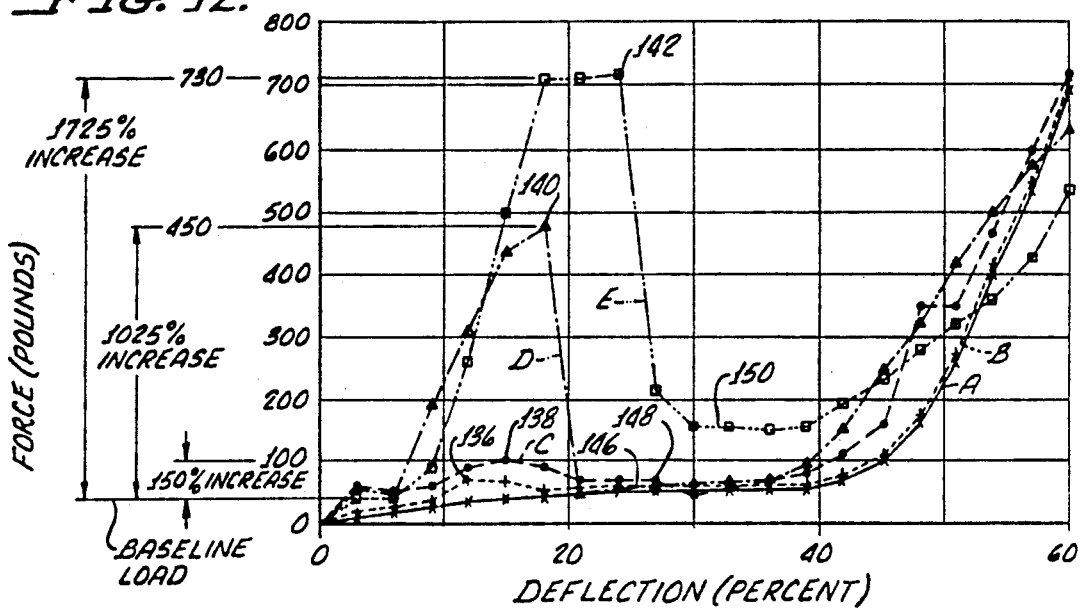
FIG. 12 is a plurality of force-deflection curves, each corresponding to an annular axially resilient coil spring having different turn angle orientation.

As shown in FIG. 12, as the turn angle θ increases, the load increases at a maximum about 90 degrees. Importantly, after the peak load, as shown at 138, 140, 142, respectively, is achieved, the force decreases rapidly to approximately the forces shown by springs A and B. Thus, these springs have working regions 146, 148 and 150, approximately the same as unturned spring A; however, as can be seen in FIG. 12, these working areas are bounded by steep load-deflection characteristics. Springs, in accordance with the present invention, have advantages in a variety of applications, as hereinabove described. As hereinbefore mentioned, although the springs shown generally are circular in shape, they could be used in other applications in irregular shapes. That is, the spring will easily fit into other shapes than round.

As shown in Table 1, the peak load is substantially greater than the base load and in fact reaches to 1725 percent when the turn angle is 90 degrees Hence, by using a turn angle, higher load can be provided. Consequently, as hereinbefore mentioned, a smaller wire can be used which will permit the use of more coils per inch thus decreasing the stress that will occur on the seal when loaded This results in longer life springs because the stress concentration thereacross is more uniform.

Also, as hereinbefore pointed out, springs, in accordance with the present invention, exhibiting the force-deflection curves as shown by curve C, D and E of FIG. 12, can be used in self-locking and self-centering applications not heretofore possible by springs exhibiting force-deflection curves as shown by curves A.

Figure 13:
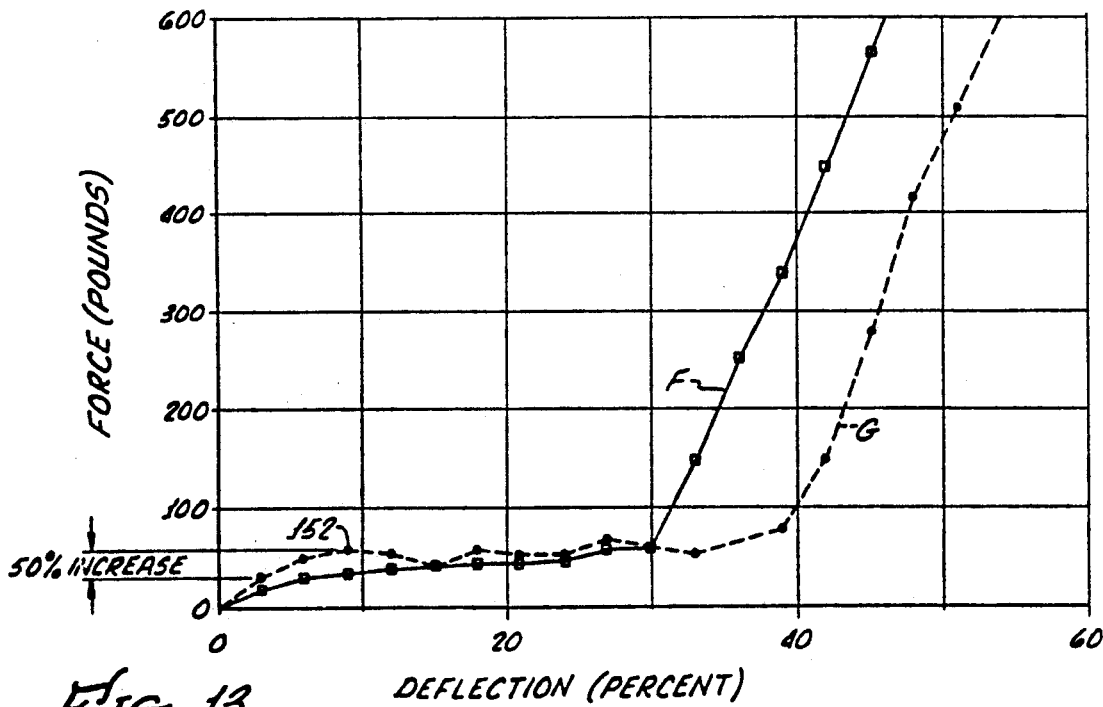
FIG. 13 is a force-deflection curve showing the effects of multiple deflection on the force-deflection characteristics of an annular axially resilient coil spring having a preselected turn angle.

It has been found that curves A through E are representative of springs whether the trailing portion is on the outside or inside of the spring. This is shown in FIG. 13 shoring curves F and G corresponding to springs F and G having specifications set forth in Table 2. As shown, curve F shows the force-deflection curve for a spring 12 having a trailing portion 56 along the outside diameter 64 of the spring 12 and curve G shows the annular spring 10 having the trailing portion 40 along the inside diameter 42 of the annular spring 10. Since the turn angle of spring G is greater than the turn angle of F, a peak load portion 152 begins to manifest itself.

A great number of springs have been tested and the performance represented by curves A through G in FIGS. 12 and 13 are representative of springs made with a back angle between one degree and 45 degrees. Particularly the springs are also representative of springs wherein the front angle is less than 35 degrees.

For determining the load-deflection characteristics of spring made in accordance with the present invention fixtures, or jigs, 160, 162, 164 and 166 shown in cross-section in FIGS. 14, 15, 16 and 17 may be employed.

TABLE 2

| Spring | # of Coils | Coil Height (in) | Coil Width (in) | Turned Height (in) | Wire Dia. (in) | Turn Angle (deg) | Coil *Spacing (in) | Trailing Portion |
|---|---|---|---|---|---|---|---|---|
| F | 67 | 0.162 | 0.179 | 0.164 | 0.022 | 32° | 0.018 | Outside diameter |
| G | 67 | 0.162 | 0.179 | 0.164 | 0.022 | 42° | 0.018 | Inside diameter |

*Actual spacing between coils, not to be confused with the pitch, e, of the spring. see Figs. 6a, 6b.

Figure 14:
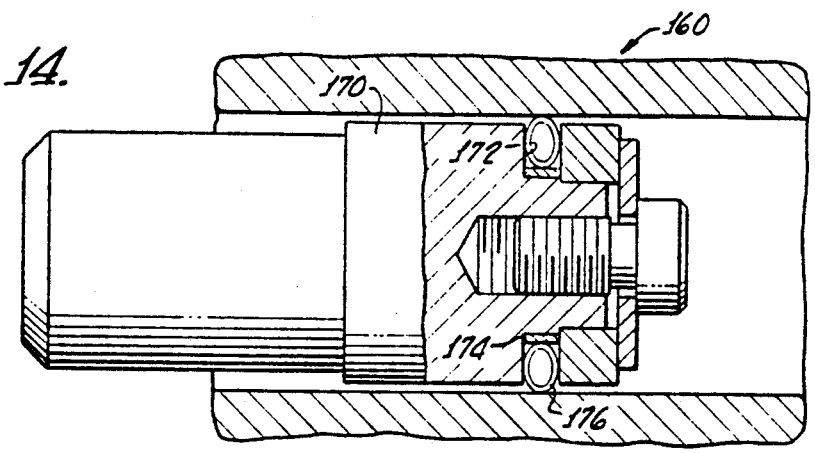
FIG. 14 is a jig for determining the load-deflection characteristics of springs made in accordance with the present invention.

In general, as shown in FIG. 14, the fixture 160 includes a piston 170 with a groove 172 and spacers 174 that vary in thickness in order to radially compress the inside diameter of a spring 176 toward the outside diameter. Specific load-deflection characteristics for spring loaded in this manner will be discussed hereinafter.

Figure 15:
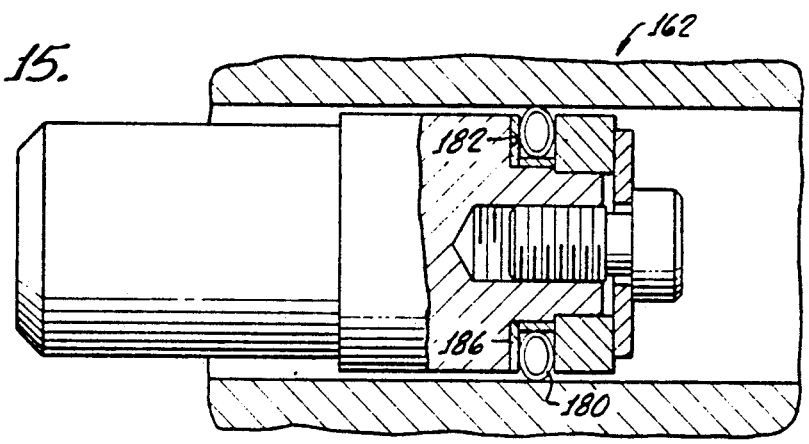
FIG. 15 is a jig for determining the load-deflection characteristics of springs made in accordance with the present invention.

The fixture 182 showing FIG. 15 is similar to jig 180 in that a spring 180 is compressed in a groove 182 with spacers 184 to radially compress the spring 180. In addition, spacers 186 are used for loading the spring 180 in an axial manner by varying the thickness of the spacers 186.

Figures 16, 17:
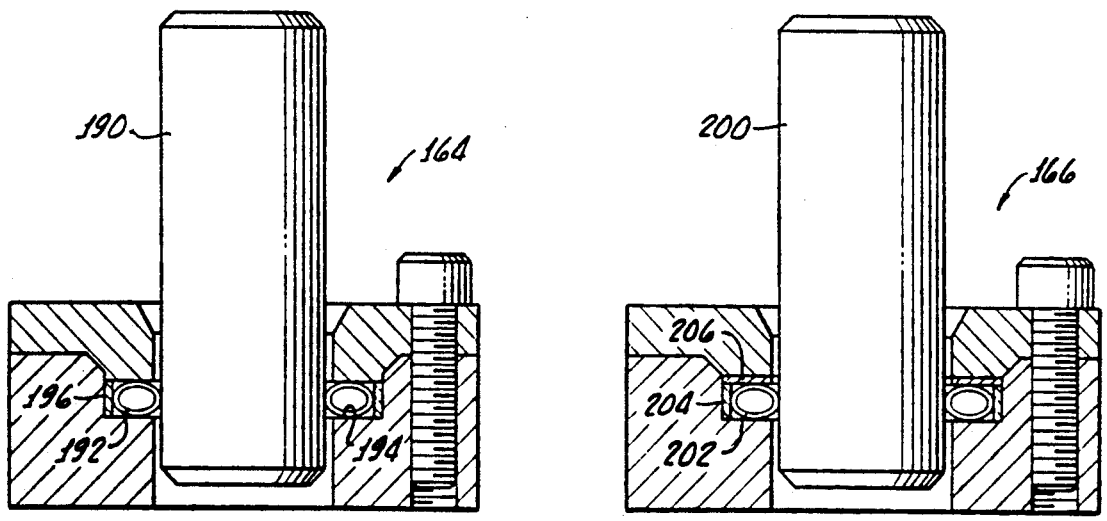
FIG. 16 is a jig for determining the load-deflection characteristics of springs made in accordance with the present invention.
FIG. 17 is a jig for determining the load-deflection characteristics of springs made in accordance with the present invention.

Fixture 164 shown in FIG. 16 utilizes a piston 190 for radially compressing a spring 192 within a groove 194 and spacers 196 compress the spring 192 from an outside diameter thereof toward an inside diameter thereof, whereas fixture 166 shown in FIG. 17, utilizes a piston 200 for radially compressing a spring 202 with spacers 204 and axially loading the spring 202 with spacers 206.

FIGS. 18-21 show load deflection characteristics for types of springs made in accordance with the present invention. Specific examples of such springs are as follows.

| SPRING - Type A | |
|---|---|
| Wire dia.: | 0.022 inches |
| Coil height: | 0.161/0.163 inches |
| Back angle: | 13/15 degrees |
| Front Angle: | 29/31 degrees |
| Coil spacing: | 0.017/0.019 inches |

The spring was made with an inside diameter of 0.750 inches with 58 coils and various springs were used having a back angle on the I.D. and some having the back angle on the O.D. In addition, such springs had the following general information. A turn angle at 0 degrees, at 30 degrees, at 55 degrees, and at 90 degrees. The turn angle varied depending on each particular spring.

| SPRING - Type B | |
|---|---|
| Wire dia.: | 0.022 inches |
| Coil height: | 0.161/0.163 inches |
| Back angle: | 15.5/17 degrees |
| Front angle: | 37/39 |
| Coil spacing: | 0.032/0.034 inches |

Spring Type B has a greater spacing between coils, approximately 1.83 times greater than the spacing between coils of spring Type A. By increasing the spacing between coils, other parameters, based on loading, deflection, etc., can be determined.

The spring in a welded position had a reference I.D. of 0.750 and 42 coils. The spring was also made with the back angle on the I.D. and back angle on the O.D. and within those parameters, in turn angles, that varied from 0, 30, 55 and 90 degrees.

Figure 18:
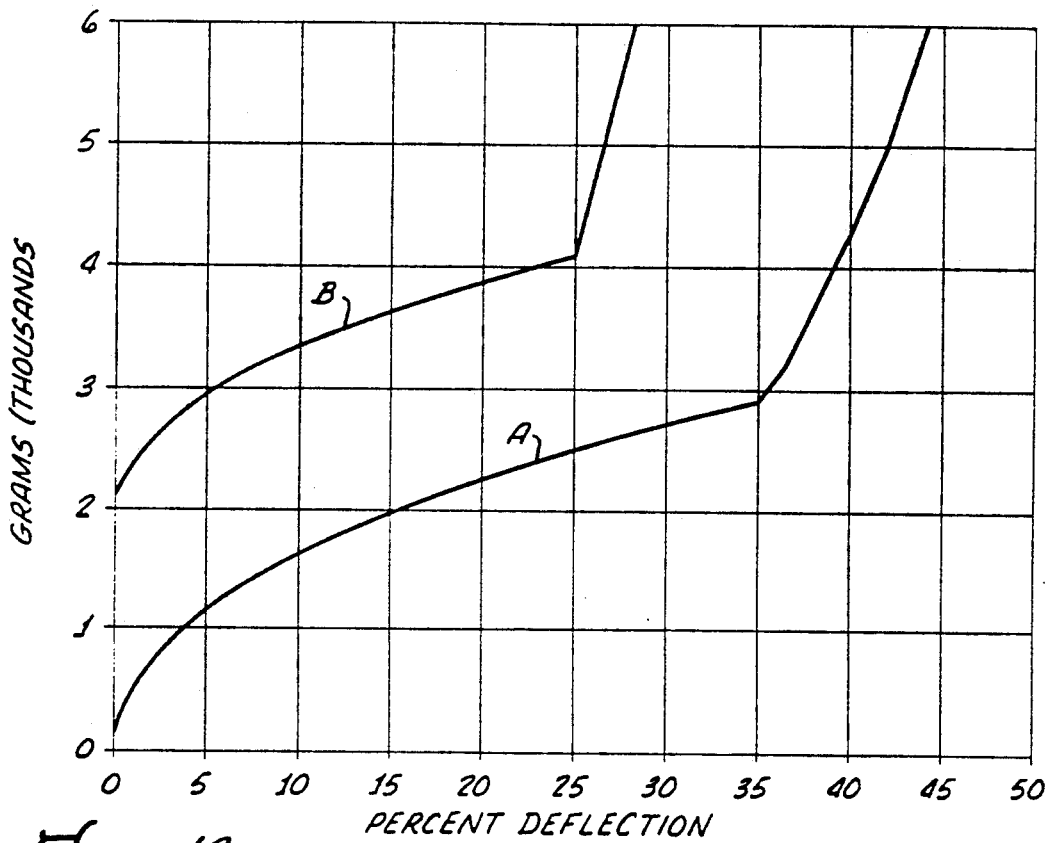
FIG. 18 shows a load-deflection characteristics for springs made in accordance with the present invention.

FIG. 18 shows a comparison between spring Type A and spring Type B with the curves therein showing the average load-deflection characteristics for various turn angles. It should be appreciated that spring Type A, the back angle on the inside diameter of the spring, has a substantially greater degree of deflection than spring Type B with the back angle on the outside diameter of the spring.

Figure 19:
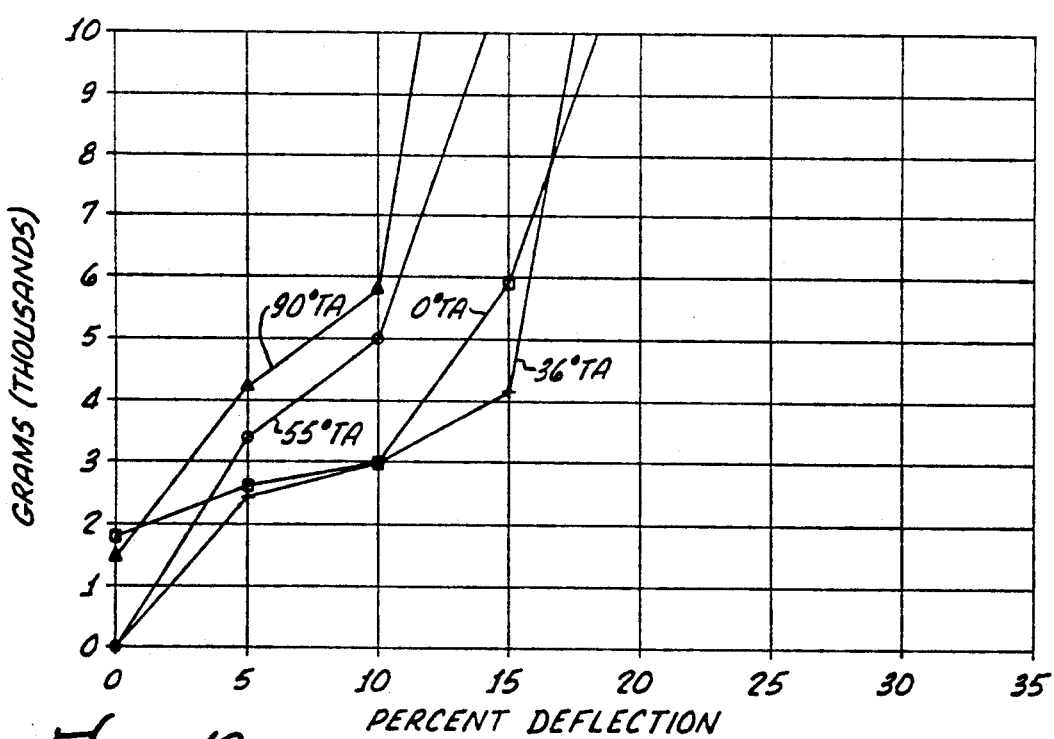
FIG. 19 shows a load-deflection characteristics for springs made in accordance with the present invention.

Shown in FIG. 19 is the force versus deflection characteristics for an A Type spring with turn angles (TA) that vary from 0, 36, 55 and 90 degrees and inserted into the Fixture 104 shown in FIG. 16 for loading the spring radially along the major axis with deflection occurring from the inside diameter toward the outside diameter and also along the minor axis in an axial manner. It should be appreciated that the degree of deflection obtained when loading the spring radially and axially is reduced substantially and generally, varies from 10 to 15 percent.

It has been determined that when loading the spring in a radial and an axial manner, the degree of deflection substantially decreases. A spring with the back angle on the outside diameter has substantially lower deflection than the spring with a back angle on the inside diameter.

Figure 20:
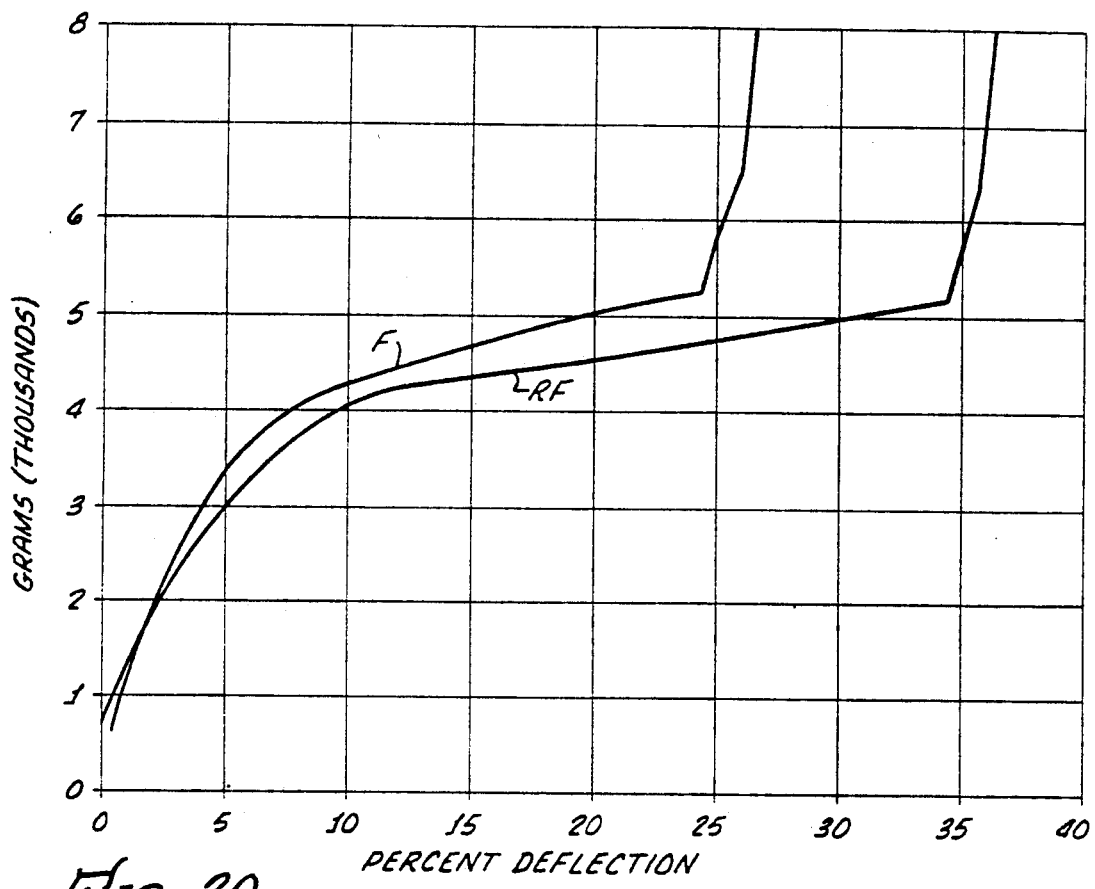
FIG. 20 shows a load-deflection characteristics for springs made in accordance with the present invention.
Figure 21:
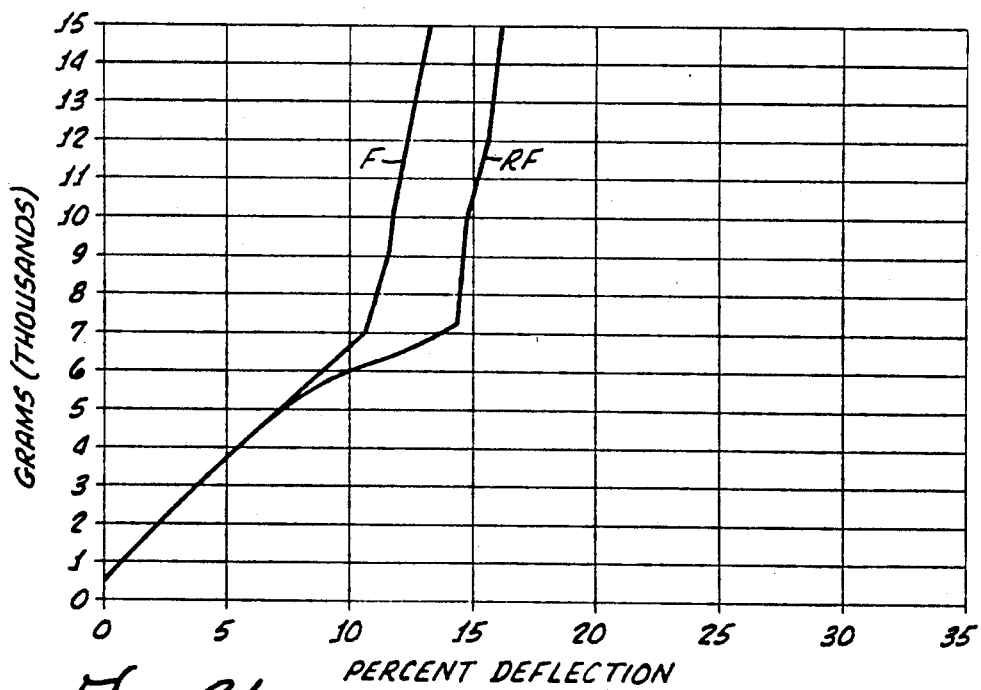
FIG. 21 shows a load-deflection characteristics for springs made in accordance with the present invention.

FIG. 20 is a load-deflection comparison between axial springs for the back angle on the O.D. curve F, than a spring having a back angle on the inside diameter curve RF. As shown, a spring with the back angle on the inside diameter has a substantially greater degree of deflection, by approximately 40 percent, than the same spring with a back angle on the outside diameter. FIG. 21 shows the load-deflection curves for axial springs having a back angle on the I.D. RF and a back angle on the O.D. outside diameter, curve F. These characteristics occur when the spring is loaded radially and axially at the same time with the deflection of the spring being made radially from the outside diameter toward the inside diameter. This should be compared with the same spring loaded from the inside diameter which is shown in FIG. 19.

By varying the spring parameters and loading direction of the spring, springs in accordance with the present invention may be tailored to fit a wide range of load-deflection characteristics, otherwise unattainable by prior art springs. This is particularly true when the wire size and number of coils may be dictated by other factors, as for example, the size of the cavity into which the spring must be disposed.

In general, there are a number of ways that the strings 10, 12, 14, 16 may be loaded into a cavity. Specifically, the cavity may be of a size that allows clearance between the coils and the cavity or, alteratively, the spring inside diameter may be smaller than the inside diameter of a cavity in which it is disposed thus causing the spring to stretch, or load, so that it is retained in the cavity.

In addition, the spring 10, 12, 14 and 16 may be sized to cause an interference between the spring coils and the cavity thereby retaining the spring in the cavity. All of these spring cavity configurations are interrelated to the loading of the spring after disposal in the a cavity.

As hereinbefore briefly mentioned, the cavity may be of a length or a shape whereby the springs follow a continuous path when joined at ends of the springs, such shape being circular, rectangular or other irregular shape. The loading of the spring develops a specific force within a certain deflection as hereinabove discussed in connection with FIG. 7.

Figure 22:
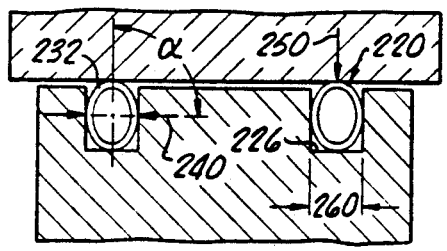
FIG. 22-27 show various embodiments of the canted coil spring assembly in accordance with the present invention in which a coil is non-invasively supported in an orientation for controlling the resilient characteristics of the coil.
Figure 23:
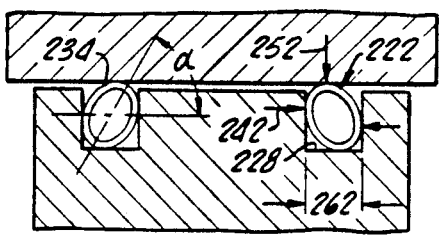
Figure 24:
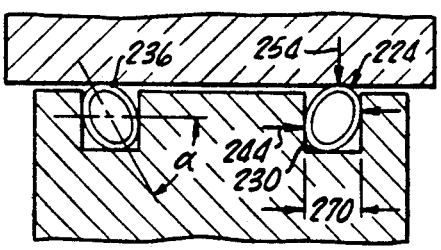

Turning now to FIGS. 22, 23 and 24, there is shown a radial spring 220, axial cone spring 222 and axial inverted cone spring 224 assembled into cavities 226, 228, 230, respectively, which illustrate embodiments of the present invention in which the groove 226, 228, 230 deflects the spring coils 232 234, 236, respectively, along a minor axis 240, 242, 244 and are loaded along a major axis 250, 252, 254.

Specifically, the radial spring 220 has an assembly turn angle α of 90 degrees and a groove width 260, smaller or equal to the coil height CH as defined in FIG. 8. This provides an interference with the spring coil 232 which retains the spring 220 within the groove 226.

Shown in FIG. 23, the axial cone spring 222 has an assembly turn angle α of less than 90 degrees, the spring 222 is deflected in the direction along the minor axis 242 thereof and the spring is assembled by generally applying force along a major axis 252. In this instance, the groove width 262 is larger than the coil height CH (see FIG. 8) but smaller than the coil width CW (see FIG. 8), in order to provide interference with the coils and retain the spring 222 within the cavity 228.

Turning to FIG. 24, the axial inverted cone 224 shown therein has an assembly turn angle α of less than 90 degrees with the spring 224 deflected in a radial direction along the minor axis 244 with a force applied generally along the major axis 254. In this instance, the groove width 270 is larger than the coil height CH but smaller than the coil width CW (see FIG. 8) so as to provide interference with the coils 236 thereby retaining the spring 224 within the cavity 230.

Figure 25:
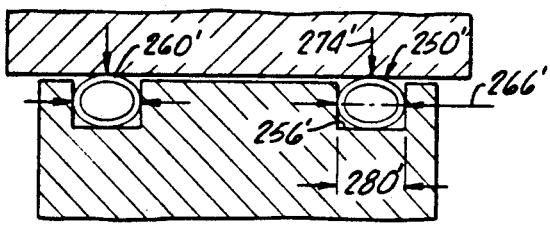
Figure 26:
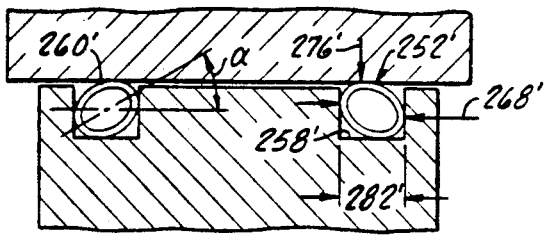
Figure 27:
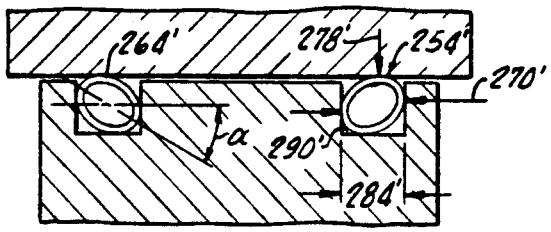

Shown in FIGS. 25, 26, 27 are axial springs 250', 252', 254', disposed in cavities 256', 258', 260', respectively and held therein by deflecting the coils 260', 262', 264' thereof along the major axis 266', 268', 270 thereof and thereafter providing primary loading along minor axis 274', 276', 278', respectively. More particularly, the spring 250' shown in FIG. 25 is an axial configuration with an assembly turn angle α (see FIG. 10) of 0 degrees. The spring 250' is deflected in a radial direction along the major axis 266 and loaded along the minor axis 274'. In this instance, the groove width 280' is smaller than the coil width CW (see FIG. 8) in order to provide an interference with coils 260' thereby retaining the spring 250' within the cavity 256'.

As shown in FIG. 26, the axial cone spring 252' has an assembly turn angle α of less than 30 degrees. The spring 252' is deflected in a radial direction along the major axis 268' and a force is generally applied along the minor axis 276'. In this instance, the groove width 282' is smaller than the coil width CW (see FIG. 8) in order to provide an interference with the coils 262' thereby retaining the spring 252' within the cavity 258'. The axial inverted cone spring 254' shown in FIG. 27 has an assembly turn angle α of less than 30 degrees. The spring 254' is deflected in a radial direction along the major axis 270' and loaded generally along the minor axis 278'. The groove width 284' is smaller than the coil width CW (see FIG. 8) in order to provide interference with the coils 264' thereby retaining the spring 254' within the cavity 290'.

In general, as shown in FIGS. 22—27, a number of cavity sizes may be used for loading a spring. Shown in FIG. 22 is a cavity having a groove width smaller or equal to the coil height. A cavity having a groove width larger than the coil height but smaller than a coil width shown in FIGS. 23 and 24 whereas a cavity having a groove width smaller than the coil width is shown in FIG. 25. FIGS. 26 and 27 show a cavity having a groove width which is smaller than the cosign of the load angle $α_L$ (see FIG. 11).

In general, a radial spring has a number of limitations when such spring is assembled into a cavity by deflecting the coils along the minor axis in applying the load along the major axis when the cavity with the smaller or equal to the coil height. In each instance, the coils do not deflect readily or turn easily and a very high initial force is developed followed by a rapid drop of such force. Therefore, in order to use a radial spring adequately, it is necessary that the groove width be larger than the coil height upon loading the spring axially along a major axis. This can be seen in FIGS. 23 and 24. Thus, in order to provide a useful spring, it is necessary that the groove width be sufficiently wide to permit an assembly turn angle of less than 80 degrees. The wider the groove width, the smaller the assembly turn angle and the lower the possibility that such spring may fatigue during loading and deflection.

As hereinbefore defined, a radial spring has a 90 degree turn angle and when such spring is housed in a cavity, the application of a force along a major axis may cause fatiguing of the spring. The degree of fatiguing will depend upon the amount of turn and the deflection of the spring coils, with the higher the turning deflection, higher their fatiguing. Of course, the degree of fatiguing will also be affected by various factors such as the amount of axial force, back angle, ratio of the coil diameter, wire diameter and the spacing of coils among other factors.

Axial springs, in accordance with the present invention, loaded into a cavity forming a 90 degree turn angle with the back angle on the inside diameter and loaded along the major axis will cause the spring coils to turn and deflect along the minor axis and generally provide a force that is nearly constant within the working deflection. The constant force within the deflection will be affected by the turn angle, the back angle, the coil diameter to wire diameter ratio and other parameters. This axial type spring is significantly different from a radial spring which is normally heavily fatigued under the same loading conditions.

An axial type spring having the back angle on the outside diameter (F type spring) has a number of limitations, particularly when the assembly turn angle is greater than 60 degrees. An F type spring having a back angle on the outside does not have a high degree of coiled deflection because the coils tend to abutt very rapidly and limit the deflection. Hence, whenever such an F type spring is used with an assembled turn angle from 60 to 90 degrees and loaded axially along the major axis, a great degree of fatiguing usually occurs. With the larger the assembly turn angle, the greater the fatiguing.

An axial type spring having the back angle on the inside diameter (RF type) has a substantially greater degree of deflection and therefore is a preferred embodiment of the present invention due to its universal use in applications involving turn angles from 0 to 90 degrees. It should be noted that when an RF type spring is assembled into a cavity having a groove with equal to or smaller than the coil height CH, the assembly turn angle is 90 degrees and under such conditions, the RF spring is the only type of spring which offers a degree of reliability since it can function with a minimum amount of fatiguing. Fatiguing of the RF type spring may occur when the assembly turn angles are between 80 and 90 degrees, being particularly acute at 90 degrees.

While the type of groove set forth in FIGS. 22—27 are rectilinear, there are a number of different types of groove configurations that can be used for assembling the spring into the cavity which retain the spring in the cavity and load the spring. Such are grooves may include those having side walls perpendicular to the horizontal plane as shown in FIGS. 22—27, however, there are other shaped grooves (not shown) having angular side walls and angular bottom surfaces may offer alternative ways for affecting the load deflection characteristics of the spring.

Factors that affect the force deflection of an axially turn spring include, but are not limited, to wire diameter, coil back angle, assembly turn angle, coil diameter to wire diameter ratio (Wd), spacing between coils and the number of coils. More particularly, the larger the wire diameter and the smaller the back angle, the higher the force that is developed for a given deflection.

The larger the assembly turn angle, the higher the force developed and the greater the deflection available. The larger the D/d ratio, the lower the force developed and the greater the possibility that a constant force is developed within the working deflection. The greater the spacing between coils, the lower the force and the higher the deflection and the greater the number of coils, the higher the force developed.

In general, the springs assume a canting direction as determined by the manner in which the spring is wound, either clockwise or counter clockwise. An RF axial spring is one that follows a counter clockwise winding direction and has a back angle on the inside diameter of the spring whereas an F type spring is a spring which follows a counter clockwise winding but has the back angle on the outside diameter of the spring.

Although there has been described hereinabove specific spring assemblies in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the invention as defined in the appended claims.

What is claimed is:

1. Canted coil spring assembly comprising:
   a plurality of coils having a major and a minor axis and canted along a centerline defined by an intersection of the major and minor axis;
   back angle means for both defining the disposition of a trailing portion of each coil with respect to a line normal to the centerline and for determining the load-deflection characteristics of the canted coil spring assembly;
   front angle means for defining the disposition of a leading portion of each coil with respect to the normal line, said front angle means being greater than said back angle means; and
   means for non-invasively supporting the plurality of coils in an orientation for controlling the resilient characteristics of the plurality of coils.

2. The canted coil spring assembly according to claim 1 wherein said coils are interconnected in a manner forming a garter-type resilient canted coil spring and said means for non-invasively supporting the garter-type resilient coil spring includes means defining cavity means for deflecting the spring along a minor axis thereof and enabling said garter-type resilient coil spring to be loaded along the major axis thereof.

3. The canted coil spring assembly according to claim 1 wherein said means for non-invasively supporting the garter-type axially resilient coil spring includes means defining a cavity means for deflecting the spring along a major axis thereof and enabling said garter-type resilient coil spring to be loaded along the major axis thereof.

4. The canted coil spring assembly according to claim 1 wherein said means for non-invasively supporting the garter-type axially resilient coil spring includes means defining a cavity for supporting and orienting said garter-type resilient coiled spring with a turn angle of greater than zero degrees and less than 90 degrees.

5. The canted coil spring assembly according to claim 1, 2, 3 or 4. wherein the trailing portion is disposed along an outside diameter of the garter-type resilient canted coil spring and the leading portion is disposed along an inside diameter of the garter-type resilient coiled spring.

6. The canted coil spring assembly according to claim 1, 2, 3 or 4 wherein the trailing portion is disposed along an inside diameter of the garter-type resilient coiled spring and the leading portion is disposed along an outside diameter of the garter-type resilient coiled spring.

7. The canted coil spring assembly according to claim 1 wherein the back angle is selected to provide a load-deflection characteristics in which the load remains relatively constant within a working deflection.

8. The canted coil spring assembly according to claim 1 wherein the back angle means defines the trailing portion at a disposition with back angle, with respect to the normal line of greater than zero degrees.

9. The canted coil spring assembly according to claim 8 wherein the front angle means defines the leading portion at a disposition with a front angle, with respect to the normal line of greater than zero degrees.

10. The canted coil spring assembly according to claim 2 wherein said cavity means has a width at most equal to the coil height.

11. The canted coil spring assembly according to claim 2 wherein said cavity means has a width greater than the coil height and less than the coil width.

* * * * *